(12) United States Patent
Brinckmann et al.

(10) Patent No.: US 11,059,680 B2
(45) Date of Patent: Jul. 13, 2021

(54) GRIPPER FOR AN OPHTHALMIC LENS AND PROCESS FOR TRANSPORTING AN OPHTHALMIC LENS

(71) Applicant: ALCON INC., Fribourg (CH)

(72) Inventors: Felix Brinckmann, Rossdorf (DE); Nils Schweizer, Bad Konig (DE); Gabriela Cocora, Aschaffenburg (DE); Alexander Bayer, Obernburg (DE)

(73) Assignee: Alcon Inc., Fribourg (CH)

( * ) Notice: Subject to any disclaimer, the term of this patent is extended or adjusted under 35 U.S.C. 154(b) by 118 days.

(21) Appl. No.: 16/662,650

(22) Filed: Oct. 24, 2019

(65) Prior Publication Data

US 2020/0130955 A1 Apr. 30, 2020

Related U.S. Application Data

(60) Provisional application No. 62/750,427, filed on Oct. 25, 2018.

(51) Int. Cl.
*B65G 47/91* (2006.01)
*B65B 35/38* (2006.01)
*B25J 15/06* (2006.01)
*B65B 35/18* (2006.01)
*B65B 25/00* (2006.01)

(52) U.S. Cl.
CPC .......... *B65G 47/91* (2013.01); *B25J 15/0658* (2013.01); *B65B 25/008* (2013.01); *B65B 35/18* (2013.01); *B65B 35/38* (2013.01)

(58) Field of Classification Search
None
See application file for complete search history.

(56) References Cited

U.S. PATENT DOCUMENTS

| 5,561,970 A | 10/1996 | Edie |
| 6,494,021 B1 | 12/2002 | Schlagel et al. |
| 6,502,876 B1 | 1/2003 | Stockhorst et al. |

(Continued)

FOREIGN PATENT DOCUMENTS

| EP | 1029789 A2 | 8/2000 |
| WO | 2011/026868 A1 | 3/2011 |

*Primary Examiner* — Ronald P Jarrett
(74) *Attorney, Agent, or Firm* — Sheng-Hsin Hu

(57) ABSTRACT

A gripper (1) for an ophthalmic lens comprises
a gripper head (14) having a bearing surface (140), the bearing surface (140) having at least one through-opening (14), the bearing surface (140) further having a separate detection through-opening (142) other than the at least one through-opening (141);
a suction channel (170) arranged in an interior of the gripper, the suction channel (170) leading to the at least one through-opening (141) in the bearing surface (140);
an overpressure channel (130) arranged in the interior of the gripper, the overpressure channel (130) leading to the at least one through-opening (141); and
a detection vacuum tube (16) arranged in the interior of the gripper, the detection vacuum tube (16) leading to the separate detection through-opening (142) in the bearing surface (140).

The detection vacuum tube (16) has a distal end which is arranged in the detection through-opening (142) in a fluid-tight manner, and the detection through-opening (142) is arranged in the center of the bearing surface (140) of the gripper.

11 Claims, 8 Drawing Sheets

(56) References Cited

U.S. PATENT DOCUMENTS

| | | |
|---|---|---|
| 8,801,066 B2 | 8/2014 | Biel |
| 9,272,424 B2 * | 3/2016 | Biel ................... B25J 15/0666 |
| 10,953,615 B2 * | 3/2021 | Clements ........... B29D 11/0024 |
| 2003/0178862 A1 | 9/2003 | Hagmann et al. |
| 2004/0074525 A1 | 4/2004 | Widman |
| 2013/0148076 A1 * | 6/2013 | Straub ................ B29D 11/0024 |
| | | 351/159.01 |
| 2014/0346795 A1 | 11/2014 | Biel |
| 2015/0071755 A1 | 3/2015 | Biel |

* cited by examiner

GRIPPER FOR AN OPHTHALMIC LENS AND PROCESS FOR TRANSPORTING AN OPHTHALMIC LENS

This application claims the benefit under 35 USC § 119 (e) of U.S. provisional application Ser. No. 62/750,427 filed Oct. 25, 2018, incorporated herein by reference in its entirety.

FIELD

The invention relates to a gripper for an ophthalmic lens and to a process for transporting an ophthalmic lens.

BACKGROUND

In the automated production of ophthalmic lenses, in particular contact lenses such as soft contact lenses, for example disposable soft contact lenses, it is necessary to handle the contact lenses safely, quickly and efficiently at certain production stations. One example of handling such contact lens is removing the contact lens from an inspection cuvette in which said contact lens has been placed in a liquid, for example water, in order to inspect the contact lens through image capturing and image processing.

To remove the inspected contact lens from the inspection cuvette, devices called grippers are typically used. The contact lens is gripped (e.g. from under water) with the aid of the gripper and is then removed from the concave bottom of the inspection cuvette. The gripped lens, after having been removed from the inspection cuvette, is subsequently transported to a packaging station where it is placed in the bowl of a (primary) packaging shell into which a metered amount of storage solution (e.g. saline) is dispensed after the contact lens has been placed in the bowl. Thereafter, the packaging shell is sealed with a cover foil and, after autoclaving, the sealed an autoclaved packaging shell is ready for distribution to the customer. For distribution, a plurality of packaging shells may be placed into a secondary package, for example, which is then shipped to the customer.

In the above-described process of removing the contact lens from the inspection cuvette and subsequent placing of the contact lens into the bowl of the packaging shell, care must be taken that only little water, preferably no water at all, is introduced in the bowl of the packaging shell at the time of placing the contact lens in the bowl. Otherwise, the saline may get diluted and its osmolality may be changed.

In addition, in the above-described process the contact lens must be securely gripped by the gripper (even from under water) and must be reliably placed in the bowl of the packaging shell to avoid that the contact lens is placed at a location (e.g. on the plane upper surface of the shell) where it may inadvertently become sealed between the foil and the upper surface of the shell. Once the contact lens has been placed in the bowl of the (primary) packaging shell, the gripper is returned to the inspection cuvette to grip the next contact lens and place it in the bowl of the next (primary) packaging shell.

A gripper suitable for this purpose is disclosed in WO 2011/026868. This gripper has a bearing surface having through-openings in the bearing surface which allow for the application of suction and/or overpressure to these openings. For the application of suction or overpressure, the gripper has a suction channel and an overpressure channel which are arranged in the interior of the gripper. Suction or overpressure is applied to the through-openings in the bearing surface through the respective channel arranged in the interior of the gripper. To grip a contact lens from the inspection cuvette from under water, the gripper is immersed in the water until the bearing surface of the gripper is placed a predetermined distance above the contact lens to be gripped. Suction is then applied to the through-openings to suck the lens against the bearing surface, resulting in water being sucked into the interior of the gripper, and further resulting in that the contact lens being sucked against the bearing surface. A small leakage stream may be allowed to flow through the overpressure channel towards the openings in the bearing surface during the application of suction in order to allow the water sucked into the interior of the gripper to be transported away, so that this water is not inadvertently dispensed from the interior of the gripper into the bowl of the (primary) packaging shell at the time the contact lens is released from the bearing surface and placed in the bowl.

The gripper disclosed in WO 2011/026868 further has a detection through-opening in the bearing surface, and the distal end of a detection vacuum tube is arranged in a fluid-tight manner in the said detection through-opening such that there is no fluid communication between the interior of the gripper and the detection through-opening. A detection vacuum can be applied to the detection through-opening through this detection vacuum tube separate and independent from the suction or overpressure applied through the suction channel and the overpressure channel, respectively.

The purpose of the detection through-opening and the detection vacuum applied thereto is to determine whether or not a contact lens actually adheres to the bearing surface of the gripper. After removal of the gripper from the inspection cuvette with the contact lens supposedly adhered to the bearing surface the detection vacuum can be applied to the detection through-opening through the said detection vacuum tube in order to confirm that a contact lens actually adheres to the bearing surface. In case a contact lens adheres to the bearing surface (i.e. in case the lens has been gripped and adheres to the bearing surface) the contact lens covers the detection through-opening, and the detection vacuum applied to the detection through-opening through the detection vacuum tube is maintained. This indicates that the contact lens has been successfully gripped. If no lens adheres to the bearing surface, the applied detection vacuum collapses significantly, indicating that no contact lens adheres to the bearing surface.

As the gripper reaches its destination location (i.e. a location above the bowl of the (primary) packaging shell), or shortly prior thereto, this detection vacuum can be applied to the detection through-opening again in order to make sure that the lens that has been detected to adhere to the bearing surface after removal from the cuvette still adheres to the bearing surface and has not got lost inadvertently, e.g. through an unwanted temporary interruption of the suction applied to the through-openings in the bearing surface. Alternatively, the detection vacuum—after having been applied to detect whether the lens has been removed from the cuvette—can be uninterruptedly maintained until the gripper has reached the destination location.

At the destination location, i.e. at a location above the bowl of the (primary) packaging shell, the gripper is lowered so that the bearing surface with the contact lens adhering thereto is arranged a predetermined distance above the bottom of the bowl of the (primary) packaging shell. Application of suction to the through-openings in the bearing surface is now terminated. Also, application of the detection vacuum to the detection through-opening is then terminated, too, if not already terminated earlier. Overpressure is then applied to the through-openings of the bearing surface of the gripper in order to release the contact lens from the bearing surface and place it in the bowl of the (primary) packaging shell by carefully blowing it off.

Thereafter, the gripper is returned to the inspection cuvette to grip the next contact lens. During its way back to the inspection cuvette, the detection vacuum may be applied again to the detection through-opening in order to make sure that the contact lens really has been released from the bearing surface and does not inadvertently continue to adhere to the bearing surface.

As mentioned already, this gripper generally works well, although there is still room for improvement. For example, in case a contact lens is not located in the center of the concave bottom of the cuvette the gripper may suck the lens against the bearing surface, however, due to the contact lens not centrally adhering to the bearing surface of the gripper it may occur that upon application of the detection vacuum the contact lens may not or may not sufficiently cover the detection opening which is arranged some radial distance away from the center of the bearing surface. For example, toric contact lenses with prism ballast may not be exactly arranged in the center of the concave bottom of the cuvette as they may not come to lie exactly in the center of the concave bottom of the cuvette when settling down in the water contained in the cuvette. In such case, the result of the detection would be "no contact lens adhering to the bearing surface" although actually a contact lens adheres to the bearing surface. As a further consequence of the contact lens adhering to the bearing surface in a decentered manner, at the destination location (packaging station) the contact lens may not be accurately placed in the bowl of the (primary) packaging shell, so that the contact lens—or part of it—may get sealed between the foil and the plane upper surface of the (primary) packaging shell.

Also, in case a contact lens inadvertently is not released from the surface of the gripper at the destination location and continues to adhere to the bearing surface of the gripper, on the way of the gripper back to the cuvette the result of the detection with the aid of the detection vacuum may be that no lens adheres to the bearing surface although actually the lens inadvertently continues to adhere to the bearing surface. When the gripper arrives at the cuvette again for gripping the next contact lens, the gripper may grip the next contact lens from the cuvette as supposedly there is no lens adhering to the bearing surface. This may lead to occurrences where—after gripping of the next contact lens—two contact lenses may simultaneously adhere to the bearing surface of the gripper. The detection vacuum, however, would only indicate that a contact lens adheres to the bearing surface and is unable to detect that actually two contact lenses adhere to the bearing surface. In such scenario, these two contact lenses may be released from the bearing surface at the destination location, however, apart from the fact that only a single contact lens is to be placed in the bowl of each individual (primary) packaging shell, the contact lenses may not be accurately placed in the bowl but rather may be placed at locations where the contact lenses—or part of them—may get sealed between the foil and the upper surface of the (primary) packaging shell. Such scenarios are to be avoided since they reduce the yield of the production process.

It is therefore an object of the invention to overcome the afore-discussed disadvantages.

SUMMARY OF THE INVENTION

The present invention suggests a gripper for an ophthalmic lens, in particular a contact lens such as a soft contact lens. The gripper comprises:

- a gripper head having a bearing surface, the bearing surface having at least one through-opening to which suction or overpressure can be applied, the bearing surface further having a separate detection through-opening other than the at least one through-opening, through which detection through-opening a separate detection vacuum can be applied independent from the suction or overpressure that can be applied to the at least one through-opening;
- a suction channel arranged in an interior of the gripper, the suction channel leading to the at least one through-opening in the bearing surface for applying suction from the interior of the gripper to the at least one through-opening in order to suck the lens against the bearing surface;
- an overpressure channel arranged in the interior of the gripper, the overpressure channel leading to the at least one through-opening, for applying overpressure from the interior of the gripper to the at least one through-opening in the bearing surface in order to release the lens from the bearing surface; and
- a detection vacuum tube arranged in the interior of the gripper, the detection vacuum tube leading to the separate detection through-opening in the bearing surface, the detection vacuum tube having a distal end which is arranged in the detection through-opening in a fluid-tight manner in order to allow the detection vacuum to be applied through the detection vacuum tube to the detection through-opening independent from the application of the suction or overpressure applied to the at least one through-opening in the bearing surface, wherein the detection through-opening is arranged in the center of the bearing surface of the gripper.

In accordance with a further aspect of the gripper according to the invention, the gripper has a central longitudinal gripper axis, and both the detection vacuum tube in the interior of the gripper and the detection through-opening in the bearing surface are arranged coaxial with the central longitudinal gripper axis.

According to still a further aspect of the gripper according to the invention, the bearing surface is a smooth surface which does not comprise any channels, grooves, or the like.

Yet in accordance with a further aspect of the gripper according to the invention, the gripper further comprises, viewed from a proximal end of the gripper towards a distal end of the gripper

- a mounting portion for mounting the gripper to a mounting support;
- a manifold attached to the mounting portion and comprising
  - a first inlet for the supply of the suction, and a first supply channel extending between the first inlet and a distal end of the first supply channel for supplying the suction in a fluid-tight manner to the distal end of the first supply channel,
  - a second inlet for the supply of overpressure, and a second supply channel extending between the second inlet and a distal end of the second supply channel for supplying the overpressure in a fluid-tight manner to the distal end of the second supply channel,
  - a third inlet for the supply of the detection vacuum, and a third supply channel extending between the third inlet and a distal end of the third supply channel for supplying the detection vacuum to the distal end of the third supply channel, and a connecting portion at a distal end of the manifold, the connecting portion having a connecting portion outer thread;

a connection insert comprising
   a first connection channel connecting in a fluid-tight manner the distal end of the first supply channel to a proximal end of the suction channel arranged in the interior of the gripper,
   a second connection channel connecting in a fluid-tight manner the distal end of the second supply channel to a proximal end of the overpressure channel arranged in the interior of the gripper, and
   a third connection channel connecting in a fluid tight manner the distal end of the third supply channel to a proximal end of the detection vacuum tube arranged in the interior of the gripper;

a suction tube coaxially arranged with the central longitudinal gripper axis and surrounding the detection vacuum tube thus forming the suction channel between the detection vacuum tube and the suction tube, the distal end of the suction tube being arranged axially spaced apart from an inner end of the detection through-opening in the bearing surface by a predetermined distance;

a (preferably cylindrical) hollow gripper shaft coaxially arranged with the central longitudinal gripper axis and surrounding the suction tube, thus forming the overpressure channel between the suction tube and the hollow gripper shaft, the hollow gripper shaft at a proximal end thereof having an abutment flange protruding radially outwardly from the hollow gripper shaft, and at a distal end thereof having a mounting portion with a mounting portion outer thread;

a (preferably cylindrical) hollow gripper head at a distal end thereof having the bearing surface with the at least one through-opening and the detection through-opening, and at a proximal end thereof having an open end, with a gripper head inner thread being provided on an inner wall at the proximal end of the hollow gripper head, the gripper head inner thread being screwed onto the mounting portion outer thread at the distal end of the gripper shaft thus mounting the gripper head to the gripper shaft;

a union nut comprising a distal nut portion having an inner diameter larger than the outer diameter of the gripper head and larger than the outer diameter of the hollow gripper shaft but smaller than an outer diameter of the abutment flange that protrudes radially outwardly from the hollow gripper shaft, the union nut further having a proximal nut portion having an inner diameter larger than the outer diameter of the abutment flange that protrudes radially outwardly from the hollow gripper shaft, the proximal nut portion having a union nut inner thread, the union nut inner thread being screwed onto the connection portion outer thread of the connection portion of the manifold, thus connecting the hollow gripper shaft with the gripper head mounted thereto to the manifold.

Still in accordance with a further aspect of the gripper according to the invention, to each of the first inlet, the second inlet and the third inlet of the manifold a separate valve is connected.

In accordance with yet another aspect of the gripper according to the invention, the at least one through-opening in the bearing surface comprises a plurality of openings which are arranged in the bearing surface along a circle.

In accordance with a further aspect, the circle has a diameter in the range of 5 mm to 10 mm, and in particular has a diameter of 5 mm, 6 mm, 7 mm, 8 mm, 9 mm, or 10 mm.

The present invention further suggests a process for transporting an ophthalmic lens, in particular a contact lens such as a soft contact lens from a start location to a destination location. The process comprises the steps of:
   providing a gripper according to any one of the preceding claims,
   positioning the gripper head with its bearing surface adjacent to the lens to be transported from the start location to the destination location,
   applying suction through the suction channel arranged in the interior of the gripper to the at least one through-opening in the bearing surface to suck the lens and make it adhere to the bearing surface,
   moving the gripper with the lens adhered to the bearing surface to the destination location,
   applying overpressure through the overpressure channel arranged in the interior of the gripper to the at least one through-opening in the bearing surface to release the lens from the bearing surface at the destination location, and
   applying a separate detection vacuum, independent from the suction or overpressure that can be applied to the at least one through-opening, to the detection through-opening in the bearing surface through the detection vacuum tube the distal of which is arranged in a fluid-tight manner in the detection through-opening so as to detect whether or not the lens is adhered to the bearing surface.

In accordance with a further aspect of the process according to the invention, the step of applying suction through the at least one through-opening in the bearing surface to suck the lens to make it adhere to the bearing surface comprises applying suction through the suction channel to the at least one through-opening and at the same time allowing a leakage flow to flow towards the at least one through-opening in the bearing surface, the leakage flow being chosen such that it essentially does not affect the suction applied.

In accordance with still a further aspect of the process according to the invention, the step of applying a separate detection vacuum to the detection through-opening in the bearing surface is performed after a predetermined time interval of application of suction through the at least one through-opening in the bearing surface.

In accordance with yet a further aspect of the process according to the invention, the step of applying a separate detection vacuum to the detection through-opening in the bearing surface is performed after a predetermined time interval of application of overpressure through the at least one through-opening in the bearing surface.

The gripper according to the invention has a number of advantages. For example, even if the lens to be gripped is not located centrally in the inspection cuvette, due to the arrangement of the detection through-opening in the center of the bearing surface the lens will in any event be gripped in a manner such that it completely covers the detection through-opening. Accordingly, regardless of whether or not the lens is centrally arranged in the cuvette (i.e. irrespective of whether or not the lens is centered relative to the bearing surface after being sucked to adhere to the bearing surface), in any event the lens completely covers the centrally arranged detection through-opening. Consequently, the result of the detection—i.e. applying a detection vacuum through the detection through-opening—is that the presence of a lens adhering to the bearing surface of the gripper is securely detected. Accordingly, it is possible to securely detect whether or not a lens has been gripped and removed from the inspection cuvette, and it is possible as well to securely detect at the destination location whether the lens still adheres to the bearing surface (see above).

This is similarly applicable in a case where a lens inadvertently has not been released from the bearing surface during placing the lens in the bowl of the (primary) packaging shell by carefully blowing the lens off of the bearing surface through the application of overpressure to the through-openings of the bearing surface. In such case the lens inadvertently continues to adhere to the bearing surface and still completely covers the detection through-opening, so that during the way back of the gripper the presence of a lens is detected when applying the detection vacuum to the detection through-opening in the bearing surface. Corrective action can then be taken (e.g. the lens inadvertently still adhering to the bearing surface will be disposed of before the gripper reaches the inspection cuvette again, e.g. by applying overpressure to the at least one, preferably a plurality of, through-opening(s) in the bearing surface). Thus, a scenario as discussed above in which two lenses may simultaneously adhere to the bearing surface can be prevented.

In addition, in case of a plurality of through-openings in the bearing surface it is possible to have a rotationally symmetrical arrangement of through-openings about the centrally arranged detection through-opening. This is advantageous as this may lead to a (geometrically) uniform application of suction through the (rotationally symmetrically arranged) through-openings thus enabling that the lens be gripped in a manner such that it is arranged on the bearing surface more centered even in cases where the lens is arranged decentered on the concave bottom of the inspection cuvette. This in turn leads to the lenses being placed more accurately in the bowl of the (primary) packaging shell, thus reducing the number of lenses being sealed between the foil and the plane upper surface of the (primary) packaging shell. Thus, the yield of the production process is further improved.

From a constructional perspective it is advantageous if the detection vacuum tube and the detection through-opening in the bearing surface are arranged coaxial with the central longitudinal gripper axis. In addition, it may be advantageous if the suction tube is also coaxially arranged with the central longitudinal gripper axis and surrounds the detection vacuum tube. The distal end of the suction tube may be arranged in the interior of the gripper axially spaced apart axially from the inner end of the detection through-opening (which represents the lowermost point of the interior of the gripper) by a predetermined distance in order to allow a small leakage stream to flow towards the through-openings of the bearing surface and to transport away any water that is sucked into the interior of the gripper during gripping the lens from under water.

A further advantageous constructional aspect relates to the bearing surface of the gripper being a smooth surface without any channels, grooves, or the like, so that once the lens has been sucked and adheres to the bearing surface, there is no fluid stream flowing in any channels, grooves or the like between the lens and the bearing surface, thus preventing the lens from unintentional drying out.

Those embodiments of the gripper according to the invention that comprise the mounting portion, the manifold, the connection insert the suction tube, the (preferably cylindrical) hollow gripper shaft, the (preferably cylindrical) hollow gripper head and the union nut are advantageous in that once the gripper has been mounted to a mounting support of the production line or of the production module of the production line and one or more components of the gripper need to be cleaned (for example, the suction tube or the detection vacuum tube may get clogged), such cleaning can be easily performed without the need to unmount the complete gripper from and subsequently remount the complete gripper to the mounting support of the production line (to which, for example, a plurality of such grippers may be mounted). The mounting portion and the manifold (which is mounted to the mounting portion) remain mounted to the mounting support of the production line while the other portions of the gripper can be easily unmounted and cleaned. This can be performed by unscrewing the union nut from the connection portion of the manifold and then moving the union nut axially beyond the distal end of the hollow gripper shaft. Thereafter, the gripper shaft, the gripper head, as well as the connection insert and the suction tube and the detection vacuum tube can be unmounted. If it turns out that one or more of the unmounted components need to be replaced, replacement of the respective individual component is also easily possible. The great advantage here is that those components of the gripper other than the mounting portion and the manifold can be easily and quickly unmounted and cleaned and/or replaced while the mounting portion and the manifold (as well as any valves connected to the manifold and any supply lines connected to the valves) may remain mounted to the mounting support of the production line.

To each of the first, second and third inlet of the manifold a separate valve may be connected which allows to individually control the supply of suction, detection vacuum, overpressure or ambient air.

A plurality of through-openings may be provided in the bearing surface, and these through-openings are arranged in the bearing surface along a circle. For example, this circle may have a diameter in the range of 5 mm to 10 mm, and in particular has a diameter of 5 mm, 6 mm, 7 mm, 8 mm, 9 mm or 10 mm. This allows for selecting a gripper head that is optimally adapted to the diameter of the lenses produced to securely suck them against and make them adhere to the bearing surface (upon the application of suction) and to subsequently release them from the bearing surface (upon the application of overpressure). From a constructional point of view, this can be easily and quickly achieved by unscrewing a gripper head not having the desired diameter of the circle along which the through-openings arranged from the gripper shaft and screwing a gripper head having the desired diameter of the circle to the gripper shaft.

As regards the process for transporting the lens from a start location to a destination location, the advantages are already discussed above as the gripper according to the invention is used in the said process. As already mentioned above, the separate detection vacuum may be applied to the detection through-opening when the lens has been sucked and adheres to the bearing surface of the gripper (for example on the way to the packaging station), or it may be applied after the lens has been released from the bearing surface, or both, so that it is possible to detect whether a lens has been successfully gripped and/or whether a lens has been successfully released.

As has also been discussed already, during the application of suction to the through-openings it may be advantageous to allow a small leakage stream to flow towards the through-opening or the through-openings in the bearing surface, and this leakage stream is preferably chosen such that it essentially does not affect the suction applied. The term "essentially does not affect the suction applied" in this regard means that the suction applied is still sufficient to securely make the lens adhere to the bearing surface. On the other hand, as already discussed above, such leakage stream allows water that has been sucked into the interior of the gripper to be reliably transported away, so that this water is not inadvertently introduced into the bowl of the (primary) packaging shell at the time of releasing the lens from the gripper. This leakage stream could be generated by supplying a small amount of overpressure (i.e. a pressure above ambient pressure) through the overpressure channel while applying suction to the through-openings, however, typically it is sufficient to allow a stream of ambient air to flow through the overpressure channel towards the through-openings in the bearing surface by connecting the overpressure channel to the ambient (i.e. by not applying overpressure).

The detection vacuum may be applied after a predetermined time interval of applying suction to the through-opening or through-openings in the bearing surface. This predetermined time interval may in particular be chosen such that the gripper has been removed from the cuvette, as has been discussed above already. Alternatively or in addition, the separate detection vacuum may be applied after a predetermined time interval of applying overpressure to the through-opening or through-openings in the bearing surface. This predetermined time interval may in particular be chosen such that the gripper has released the lens in order to make sure that there is no lens that inadvertently continues to adhere to the bearing surface (e.g. due to not having been successfully released from the bearing surface).

BRIEF DESCRIPTION OF THE DRAWINGS

Further advantageous aspects of the invention will become apparent from the following description of embodiments of the invention with the aid of the drawings in which.

DETAILED DESCRIPTION OF EMBODIMENTS

Figure 1:
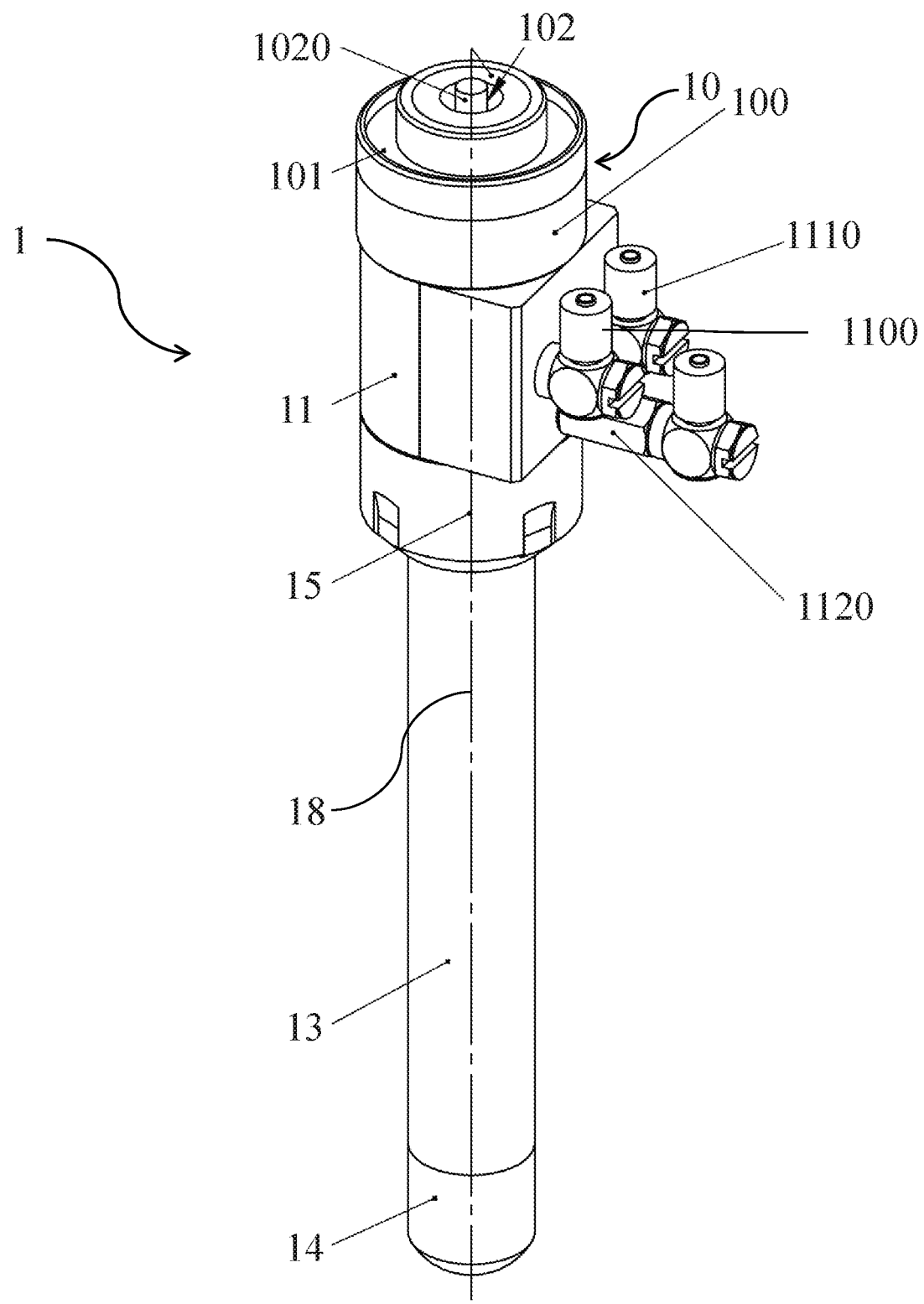
FIG. 1 shows a perspective view of an embodiment of the gripper according to the invention.

FIG. 1 shows a perspective view of an embodiment of the gripper 1 according to the invention. Gripper 1 comprises a mounting portion 10 which comprises two mounting pieces 100 and 101 as well as a mounting screw 102 (see also FIG. 3) the threaded end 1020 of which protrudes centrally from the proximal end of the gripper 1. Mounting screw 102 serves for mounting the gripper to a mounting support (not shown) of the production line or of production module of the production line. A plurality of such grippers may be mounted to this mounting support for concurrently handling a plurality of lenses.

Gripper 1 further comprises a manifold 11 which is attached to the mounting portion 10 (for example with the aid of threaded pins, not shown). Manifold 11 comprises a first inlet 110, a second inlet 111 and a third inlet 112 (see FIG. 3). A first valve 1100 is mounted to first inlet 110, a second valve 1110 is mounted to second inlet 111, and a third valve 1120 is mounted to third inlet 112 (each valve being represented by a respective connection piece). An overpressure supply line may be mounted to first valve 1100, a suction supply line may be mounted to second valve 1110, and a detection vacuum supply line may be mounted to third valve 1120. The separate valves 1100, 1110, 1120 allow that the supply of suction, overpressure, detection vacuum or ambient air to inlets 110, 111, 112 can be separately and independently controlled.

Figure 2:
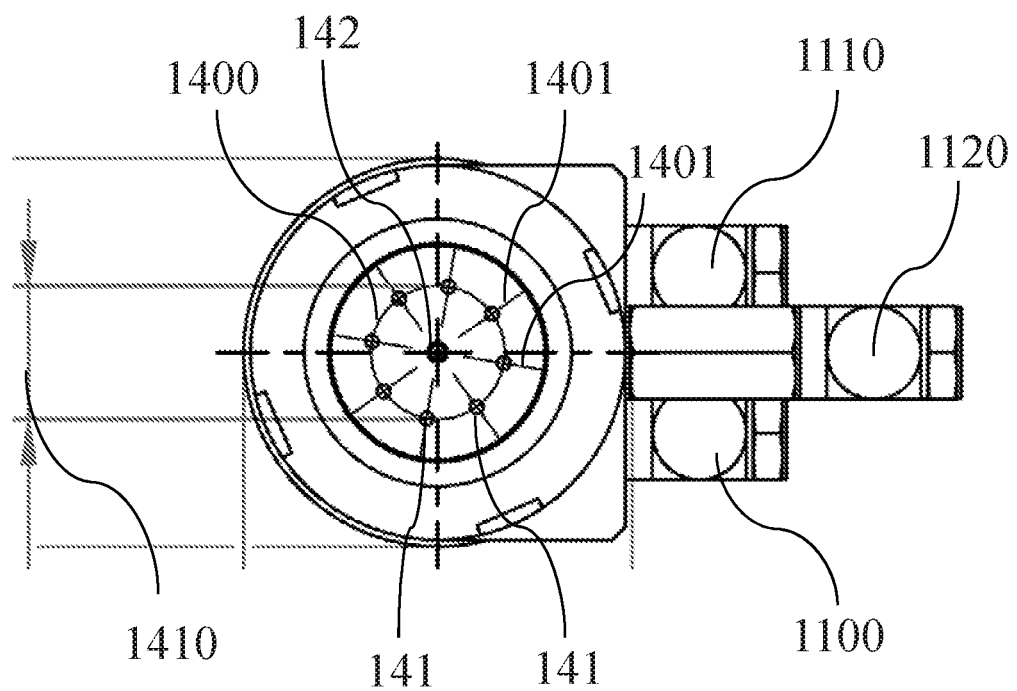
FIG. 2 shows a bottom view of the embodiment of the gripper of FIG. 1.

Gripper 1 (see also FIG. 4) further comprises a connection insert 12, a cylindrical hollow gripper shaft 13, a cylindrical hollow gripper head 14 and a union nut 15. Gripper shaft 13, at a proximal end thereof, has an abutment flange 131 that protrudes radially outwardly from gripper shaft 13. At its distal end, gripper shaft 13 has a mounting portion 132 (of reduced outer diameter) with a mounting portion outer thread 133. Gripper head 14—at its distal end—has a bearing surface 140 having a plurality of through-openings 141. As can be seen in FIG. 2, a number of eight through-openings 141 may be provided in bearing surface 140, for example, and these through-openings 141 may be arranged along a circle 1400 having a diameter 1410 (the circle 1400 is represented in FIG. 2 only for the purpose of showing the arrangement of the through openings 141, the circle line does not really exist on the bearing surface 140). The through-openings 141 are angularly equidistantly spaced from one another as is indicated by the lines 1401 (i.e. one through-opening 141 is arranged every forty-five degrees in the case of eight through-openings 141 in total). The lines 1401 illustrating the angular displacement of the through-openings 141 relative to one another do not exist on the bearing surface 140 of the gripper either, they are shown in FIG. 2 for illustration purposes only. As can be further seen in FIG. 2, in addition to the through-openings 141 a detection through-opening 142 is arranged in the center of the bearing surface 140 of gripper head 14. At a proximal end of gripper head 14, gripper head 14 has an open end, with a gripper head inner thread 143 (see FIG. 9) being provided on an inner wall of gripper head 14. Gripper head inner thread 143 engages with mounting portion outer thread 133 provided on mounting portion 132 of gripper shaft 13 (see FIG. 7), thus mounting gripper head 14 to gripper shaft 13.

Figure 4:
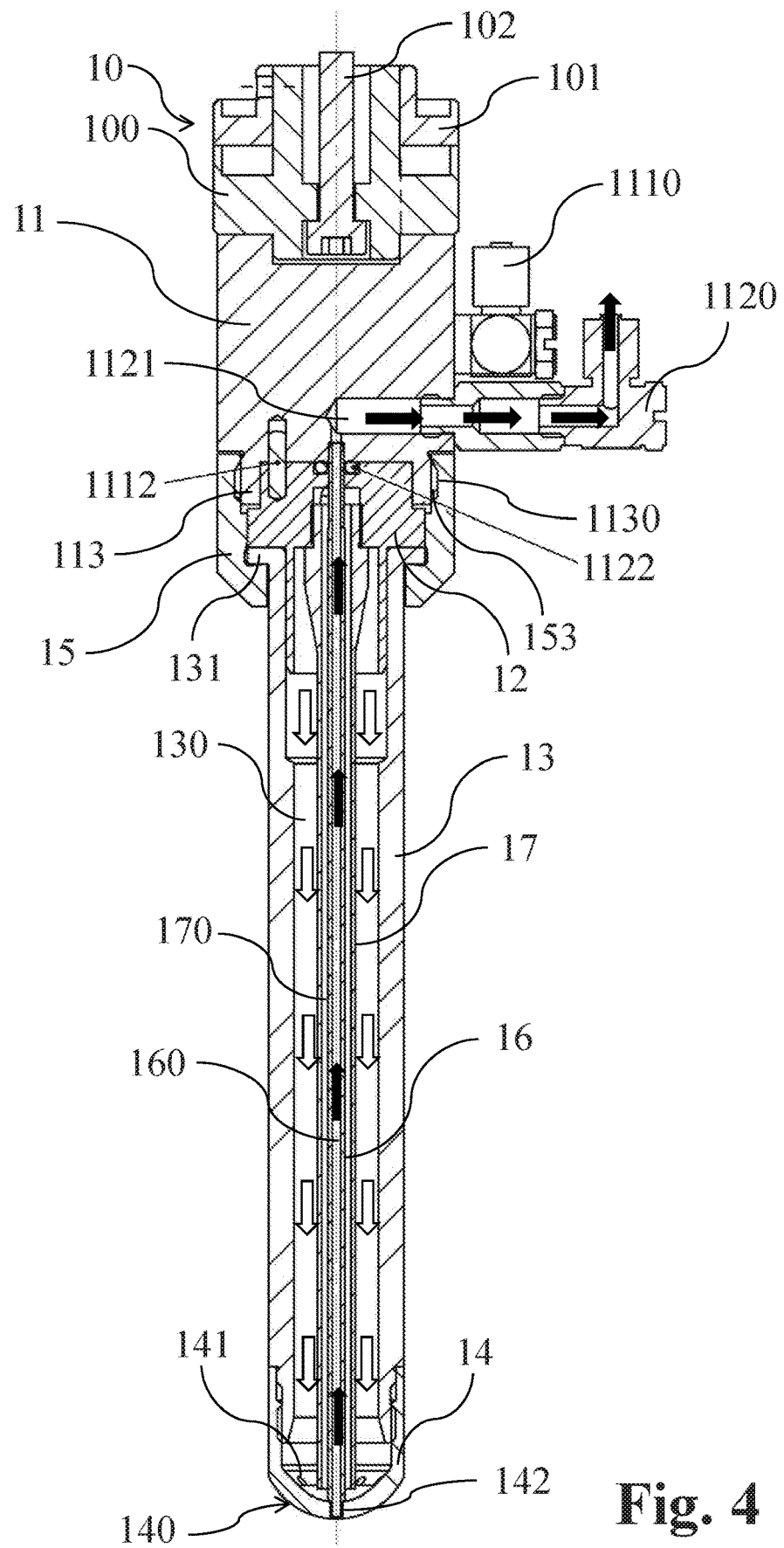
FIG. 4 shows a longitudinal section along line IV-IV in FIG. 3 of the embodiment of the gripper of FIG. 1.
Figure 5:
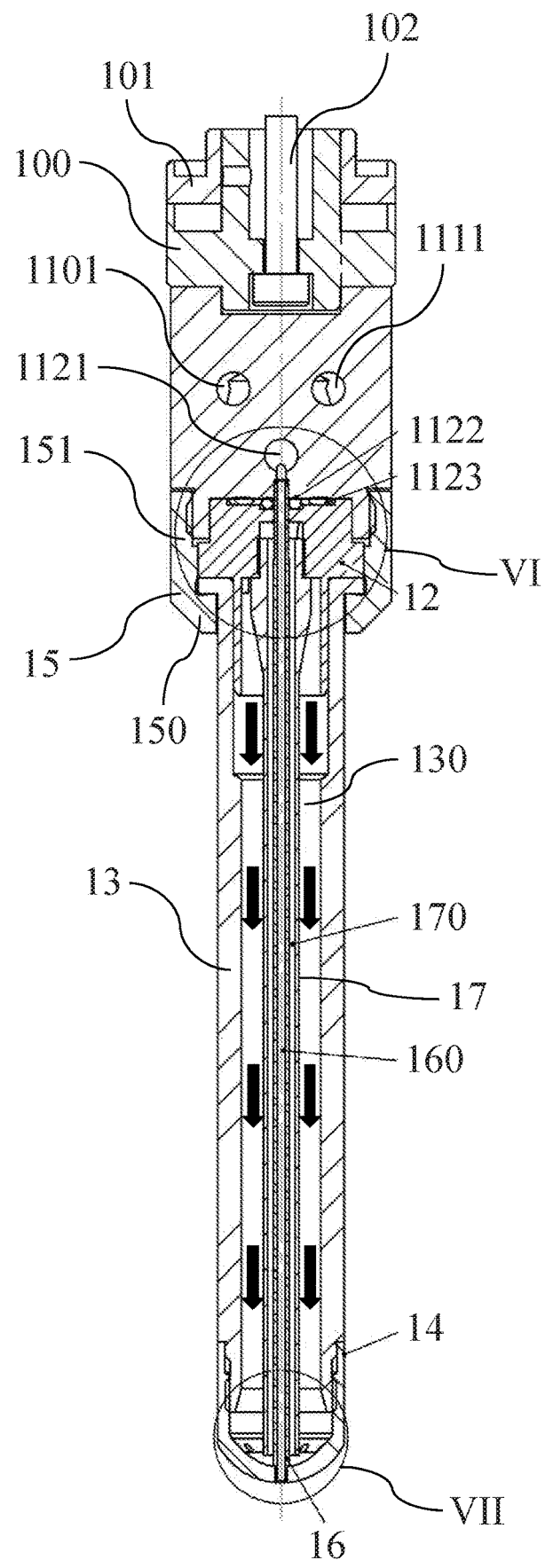
FIG. 5 shows a longitudinal section along line V-V in FIG. 3 of the embodiment of the gripper of FIG. 1.

The longitudinal sections through gripper 1 shown in FIG. 4 and FIG. 5 show more constructional details of gripper 1. As can be seen in FIG. 4, there is a mounting pin 1112 which makes sure that the connection insert 12 is inserted in the correct (unique) rotational orientation relative to the manifold 11. Manifold 11 comprises a connecting portion 113 at its distal end, and this connecting portion 113 is provided with a connecting portion outer thread 1130. Connecting portion outer thread 1130 of manifold 11 engages with a union nut inner thread 153 of union nut 15. Union nut 15 comprises a distal nut portion 150 having an inner diameter which is larger than the outer diameter of gripper shaft 13 and larger than the outer diameter of gripper head 14 but smaller than the outer diameter of the abutment flange 131 of gripper shaft 13. Union nut 15 further has a proximal nut portion 151 having an inner diameter larger than the outer diameter of the abutment flange 131 that protrudes radially from gripper shaft 13. It is this engagement of the connecting portion outer thread 1130 of manifold 11 and the union nut inner thread 153 of union nut 15 which connects gripper shaft 13 with gripper head 14 mounted thereto to the manifold 11 and thus securely holds the components of gripper 1 together, as will be explained in more detail below when describing the disassembly of the individual components of gripper 1.

Gripper 1 further comprises a detection vacuum tube 16 which is coaxially arranged with the longitudinal axis 18 (see FIG. 1) of gripper 1 that runs through detection opening 142 arranged in the center of bearing surface 140. The distal end of detection vacuum tube 16 is arranged in a fluid-tight manner in detection through-opening 142, as can be seen best in FIG. 7, so that a fluidically separate detection vacuum channel 160 is formed.

Gripper 1 further comprises a suction tube 17 which is also coaxially arranged with the longitudinal axis 18 of gripper 1. Suction tube 17 is further arranged to surround detection vacuum tube 16 such that an annular suction channel 170 is formed between suction tube 17 and detection vacuum tube 16. The distal end of suction tube 17 ends in the interior of the gripper shaft 13 such that the distal end is axially spaced apart from an inner end of detection through-opening 142 (which represents the lowermost point of the interior of the gripper) by a predetermined distance 173, as can again be seen best in FIG. 7.

Figure 6:
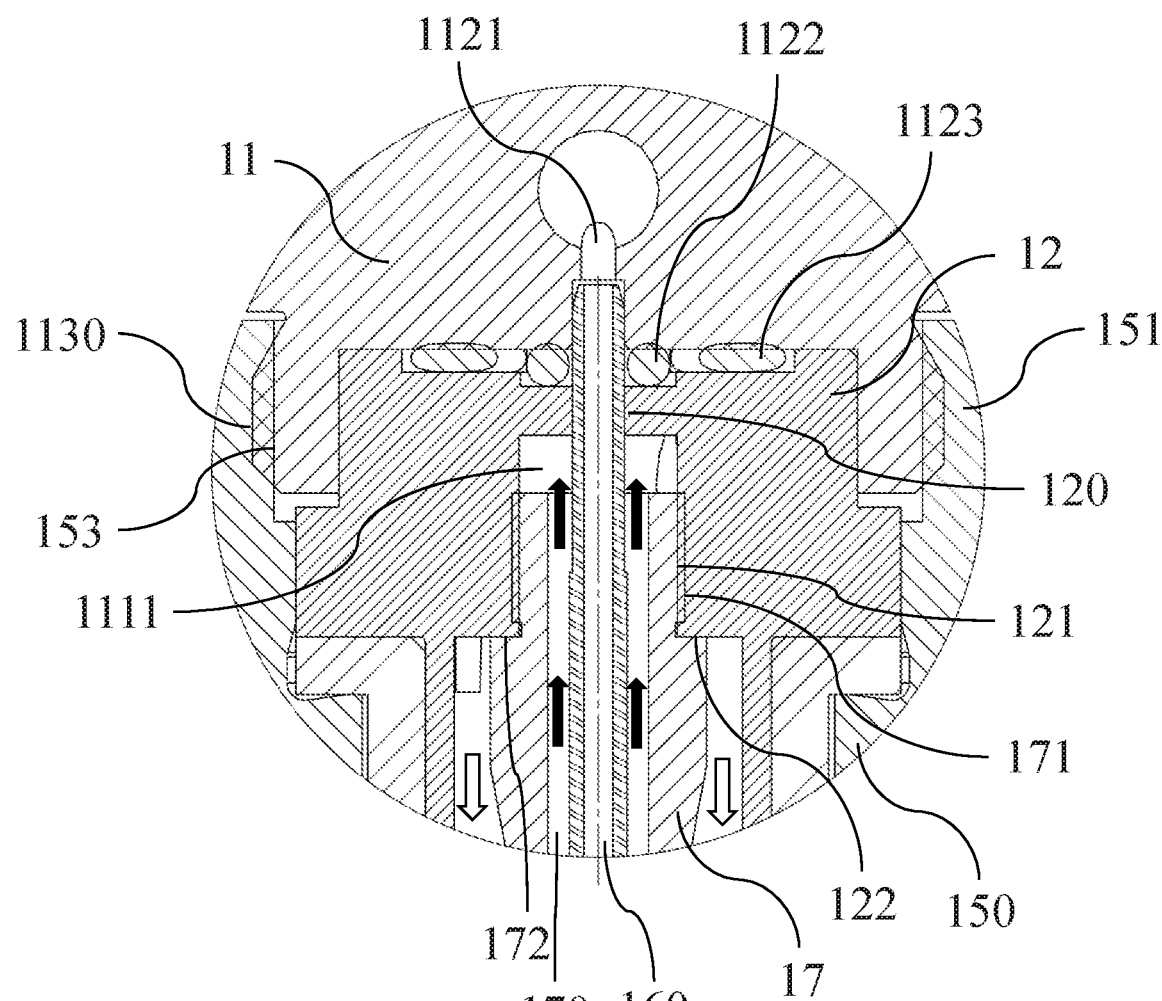
FIG. 6 shows the detail VI of FIG. 5 in an enlarged view.

As can be seen in FIG. 6, the proximal end of detection vacuum tube 16 is guided through a centrally arranged through-opening 120 in connection insert 12 and is in communication with a distal end of a detection vacuum supply channel 1121 in manifold 11 in a fluid-tight manner, i.e. the detection vacuum supply channel 1121 is not influenced by the application of overpressure or suction to any of the other supply channels provided in manifold 11. Detection vacuum supply channel 1121 extends from a proximal end of the said channel 1121 at inlet 112 of manifold 11 to the said distal end of the said channel 1121 in a fluid-tight manner. An O-Ring 1122 is arranged near the distal end of detection vacuum tube 17 and between the connection insert 12 and the manifold 11, with an additional larger diameter O-Ring 1123 being arranged between the connection insert 12 and the manifold 11 so as to provide a fluid-tight seal.

Figure 8:
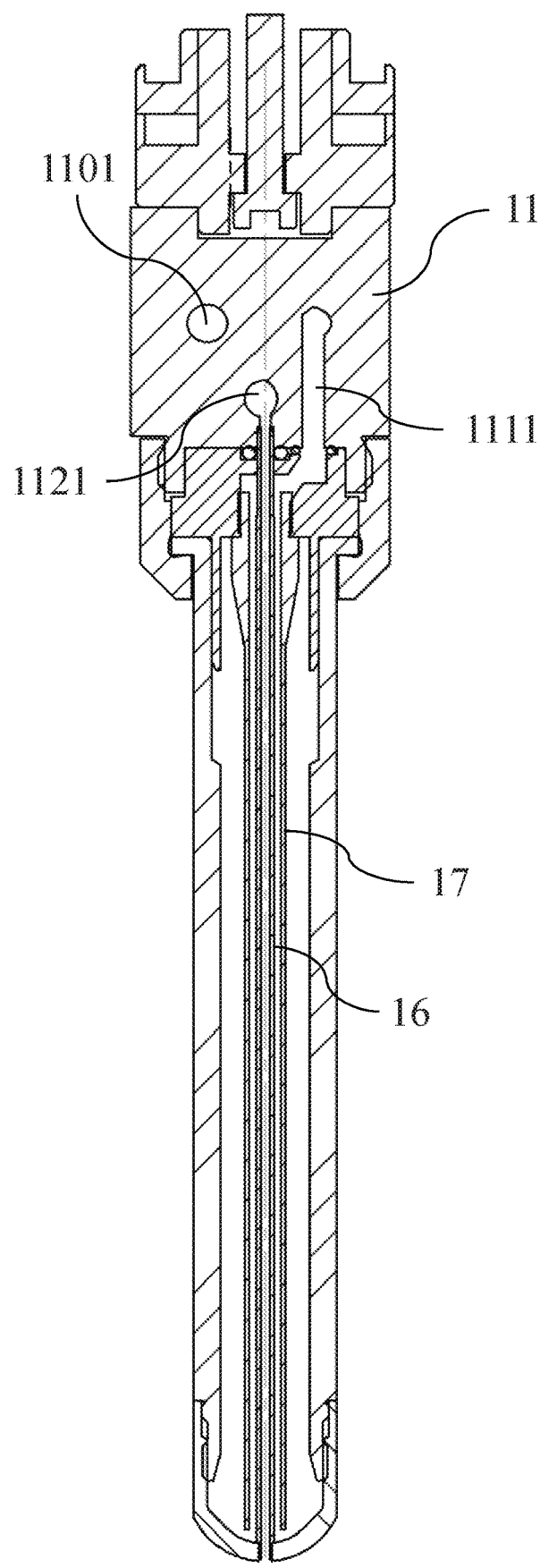
FIG. 8 shows a longitudinal section along line VIII-VIII in FIG. 3 of the embodiment of the gripper of FIG. 1.

As can be further seen in FIG. 6, the proximal end of suction tube 17 is provided with an external thread 171 that is screwed in to a corresponding internal thread 121 of connection insert 12, until a flange 172 of suction tube 17 abuts against an abutment surface 122 of connection insert 12. In this manner, the distal end of a suction supply channel 1111 in manifold 11—through a separate connection channel in connection insert 12—is in fluid-tight communication with the annular suction channel 170 formed between suction tube 17 and the detection vacuum tube 16. Suction supply channel 1111 extends from a proximal end of the said channel 1111 at first inlet 111 of manifold 11 to the said distal end of channel 1111 in a fluid-tight manner. This suction supply channel 1111 can be seen best in FIG. 8.

Turning back to FIG. 4 and FIG. 5, an annular overpressure channel 130 is formed between gripper shaft 13 and suction tube 17. The proximal end of this annular overpressure channel 130 is—through a further separate connection channel in connection insert 12—in fluid-tight communication with a distal end of an overpressure supply channel 1101 in manifold 11. Overpressure supply channel 1101 extends from a proximal end of said channel 1101 at second inlet 110 to the said distal end of overpressure supply channel 1101 in a fluid-tight manner.

Figure 3:
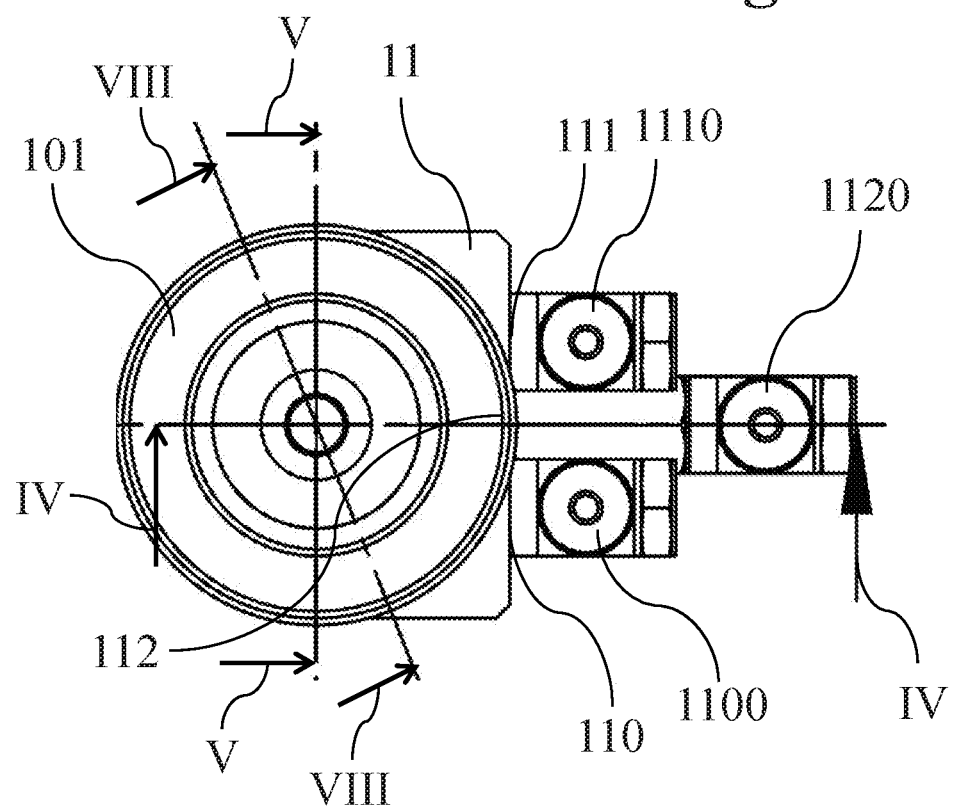
FIG. 3 shows a top view of the embodiment of the gripper of FIG. 1.

It is evident, therefore, that the detection vacuum, the suction and the overpressure can be supplied to the detection channel 160, the suction channel 170 and the overpressure channel 130, respectively, separately and independent from one another and controlled by the respective valves 1120, 1110 and 1100 mounted to the inlets 112, 111 and 110 (see FIG. 3).

Operation of the gripper is described in the following by way of example during a process of removing a lens which is immersed in water in an inspection cuvette. First of all the gripper is immersed in the water contained in inspection cuvette such that the bearing surface 140 is located in close proximity to the lens to be sucked. Valve 1110 is then controlled in a manner such that suction is applied through suction channel 170 resulting in water being sucked into the interior of the gripper. Also, the lens is sucked against the bearing surface 140 through the suction applied to the through-openings 141 by the application of suction through suction tube 17. At the same time, a small leakage stream is allowed to flow towards the through-openings 141 through the overpressure channel 130, and this leakage stream helps to transport away the water that has been sucked into the interior of the gripper.

This leakage stream may be controlled with the aid of valve 1100 by allowing ambient air to flow through overpressure channel 130 (i.e. no overpressure is applied, only ambient air is allowed to flow through overpressure channel 130). Alternatively, a small overpressure may be applied instead. In any event, the leakage stream is chosen such that it does not essentially affect the suction applied to the through-openings 141 through suction channel 170 in order to keep the lens adhered to bearing surface 140.

This scenario is shown in FIG. 6 in which the suction applied through suction channel 170 is indicated by arrows with a filled head whereas the leakage stream is indicated by arrows with a head that is not filled. The water sucked into the interior of gripper 1 is transported away through suction channel 170 formed between suction tube 17 and detection vacuum tube 16.

Alternatively, it is conceivable that during an initial phase, i.e. until the lens has been sucked against the bearing surface 140 and until gripper 1 has been moved out of the inspection cuvette, only suction is applied to the through-openings 141 through suction channel 170 (i.e. without concurrently allowing a leakage stream to flow through overpressure channel 130). Only thereafter, i.e. once the gripper with the lens adhered thereto has been moved out of the inspection cuvette, the leakage stream may be allowed to flow through the overpressure channel 130 to more efficiently transport away the water that has been sucked into the interior of the gripper. An additional advantage of the leakage stream flowing through overpressure channel 130 is that an unwanted drying out of the lens (due to only suction being applied) is avoided.

Figure 7:
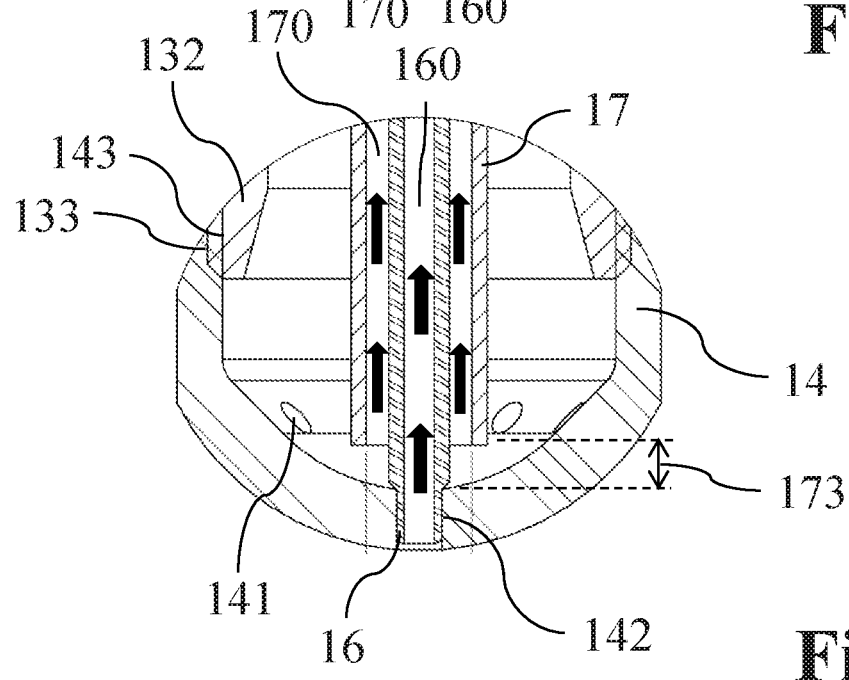
FIG. 7 shows the detail VII of FIG. 5 in an enlarged view.

After the gripper 1 has been moved out of the cuvette (e.g. axially moved upwardly in FIG. 4 or FIG. 5) or during the transport of the lens from the start location (i.e. from the cuvette) to the destination location (for example to a packaging station where the lens is to be placed in the bowl of a primary packaging shell), in addition to the suction applied to the through-openings 141 through suction channel 170 for making the lens adhere to the bearing surface 140, a detection vacuum may be applied (at least temporarily) to detection through-opening 142 arranged in the center of bearing surface 140 through detection vacuum channel 160 formed by detection vacuum tube 16. This scenario is indicated in FIG. 7 in which the arrows with the filled head in suction channel 170 indicate that suction is applied while the arrows with the filled head in the detection channel 160 indicated that the detection vacuum is applied, too. Again, the leakage stream in the overpressure channel 130 is indicated by the arrows the heads of which are not filled. When a lens adheres to the bearing surface 140 it closes the centrally arranged detection through-opening 142 and the vacuum applied to the detection through-opening 142 through detection vacuum channel 160 formed by tube 16 is maintained. This indicates that the lens has been successfully sucked against the bearing surface 140.

The detection vacuum may then be continuously applied to the detection through-opening 142 until gripper 1 has reached the destination location in order to make sure that the lens still adheres to the bearing surface at the time gripper 1 has reached the destination location. Alternatively, the detection vacuum may be applied to the detection through-opening 142 after the gripper has been moved out of the cuvette to make sure that the lens has been successfully sucked against the bearing surface (i.e. the lens has been successfully removed from the inspection cuvette) and is then terminated again. At the time gripper 1 reaches the destination location, the detection vacuum may be applied again to the detection through-opening 142 in order to make sure that the lens has been successfully transported to the destination location.

Once gripper 1 has reached the destination location, application of suction to the through-openings 141 (and also application of the detection vacuum to the detection through-opening 142) is terminated. Overpressure is now applied to the through-openings 141 through the overpressure channel 130 formed between the gripper body 13 and the suction tube 17. Thus, the lens is released from the bearing surface 140 (it is 'blown' off). The overpressure is chosen such that the lens is reliably released from the bearing surface while at the same time is carefully placed in the bowl of the (primary) packaging shell.

At the time of arriving at the destination location, before placing the lens into the bowl, it is also possible that overpressure and suction are simultaneously applied for a short time interval to avoid that any water still present in the interior of gripper 1 is introduced into the bowl of the (primary) packaging shell, however, thereafter, overpressure is applied only in order to reliably release the lens from the bearing surface.

Once the lens has been placed in the bowl of the (primary) packaging shell, gripper 1 is moved back to the inspection cuvette for removing the next lens which has meanwhile been placed in the inspection cuvette and has been inspected. During the way back, detection vacuum may be applied again to the detection through-opening 142 in order to make sure that there is no lens inadvertently adhering to the bearing surface 140 (this would indicate that the lens has not been placed in the bowl of the primary packaging shell). In such case, corrective action must be taken. For example, the lens inadvertently still adhering to the bearing surface is disposed of (e.g. blown off into a waste receptacle).

By way of example only, the suction applied to the through-openings 141 through suction channel 170 may be 400 millibar (mbar). The overpressure applied to the through-openings 141 through overpressure channel 130 may be 200 millibar (mbar). The detection vacuum applied to detection through-opening 142 may be 200 millibar (mbar) after having removed the lens from the cuvette (i.e. when determining whether the lens has been successfully removed from the cuvette), and may be 180 millibar (mbar) or at the time the gripper is on its way back after having transported the lens to the destination location. Of course, it is also possible to use the same amounts of detection vacuum in both instances. It is to be noted, that the afore-mentioned values for the suction, the overpressure and the detection vacuum are mentioned by way of example only, and that it is possible to use different values for the suction, overpressure and detection vacuum.

Figure 9:
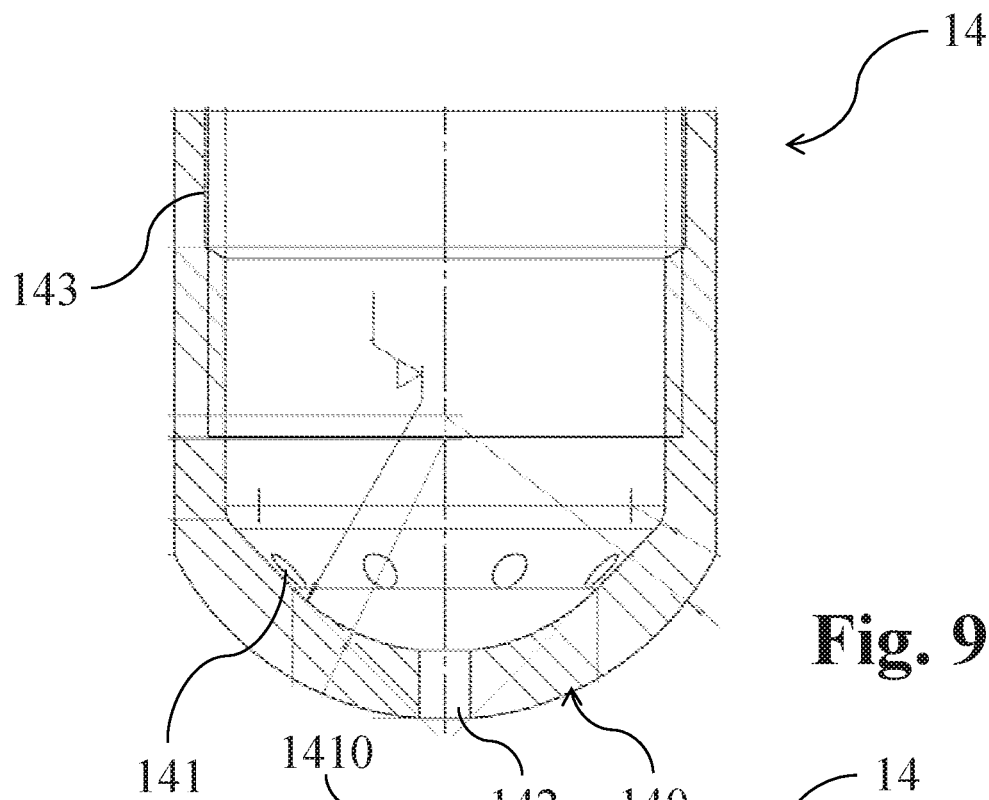
FIG. 9 shows a longitudinal section of a first embodiment of a cylindrical gripper head with the through-openings in the bearing surface arranged along a circle having a first diameter.
Figure 10:
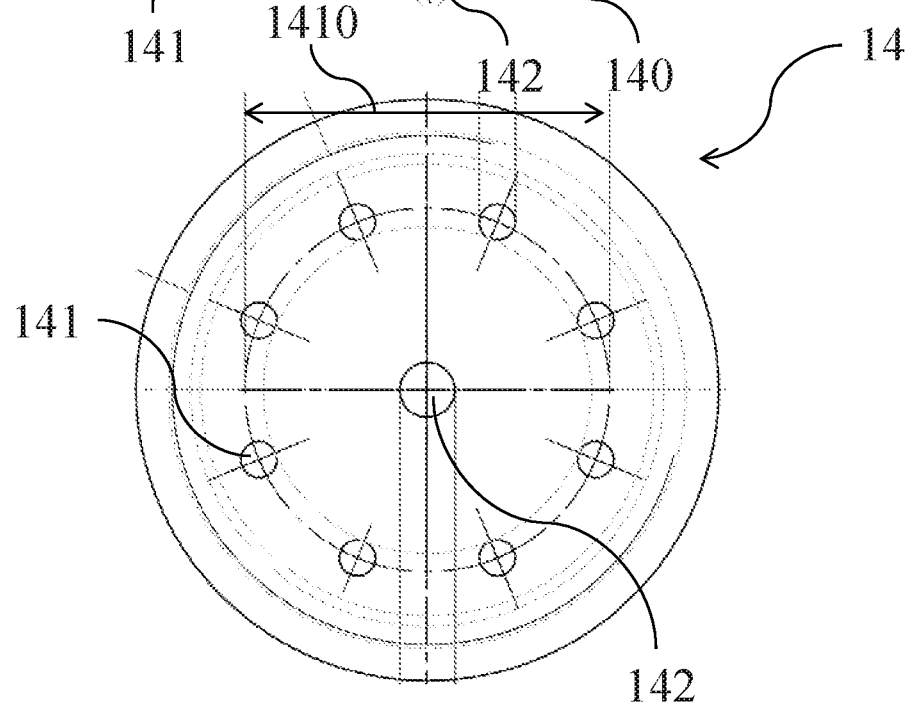
FIG. 10 shows a top view of the first embodiment of the cylindrical gripper head of FIG. 9.

FIG. 9 shows the gripper head 14 of FIG. 1 with the through-openings 141 in the bearing surface 140 as well as the detection through-opening 142 arranged in the center of the gripper head 14. As can be seen in FIG. 10, these through-openings 141 are arranged along a circle having a diameter 1410. For example, this diameter 1410 may be in the range of 5 mm (millimeter) to 10 mm, and may in particular be 5 mm, 6 mm, 7 mm, 8 mm, 9 mm or 10 mm. As already explained, at its proximal end gripper head 14 is provided with inner thread 143 which can be screwed on corresponding outer thread 133 provided on the outer surface of a reduced outer diameter portion of gripper body 13 at the distal end of gripper body 13, so that once gripper head 14 is screwed onto gripper body 13 the outer diameter of the gripper body down to the bearing surface has a uniform outer diameter as if it were made from a single piece (see FIG. 1, FIG. 8, etc.).

Figure 11:
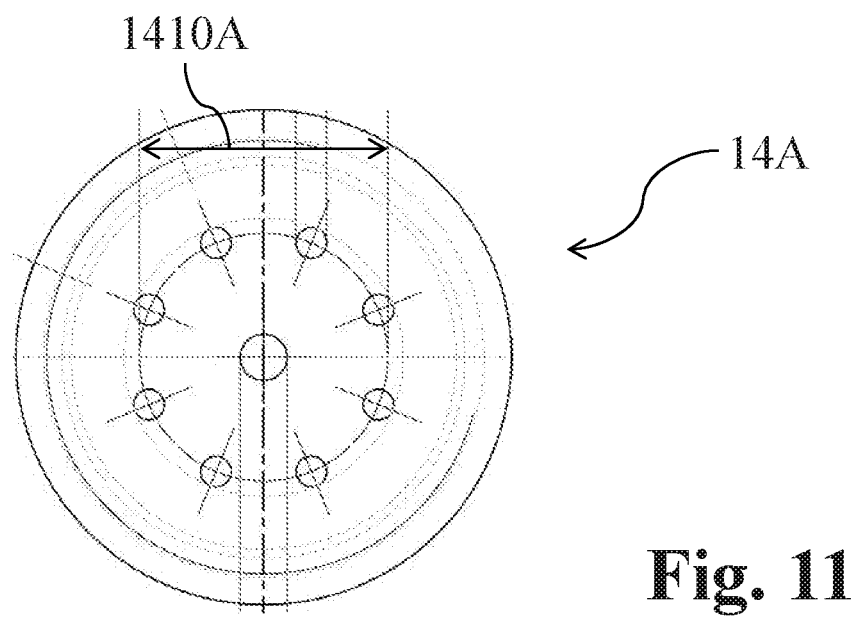
FIG. 11 shows a top view of a second embodiment of the cylindrical gripper head with the through-openings in the bearing surface arranged along a circle having a second diameter.
Figure 12:
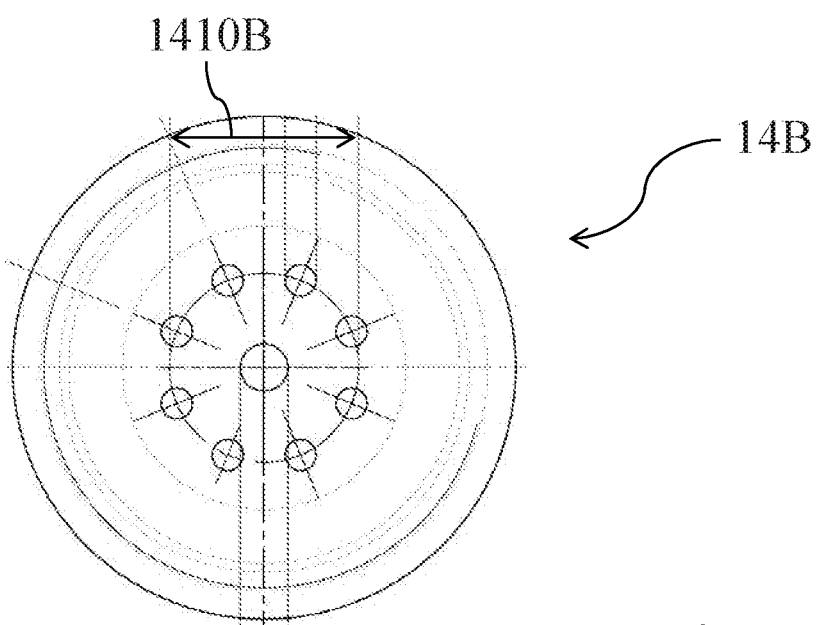
FIG. 12 shows a top view of a third embodiment of the cylindrical gripper head with the through-openings in the bearing surface arranged along a circle having a third diameter.

FIG. 11 and FIG. 12 show further embodiments of a gripper head 14A and 14B which essentially differ from the embodiment shown in FIG. 9 and FIG. 10 in that the diameter of the circle 1410A or 1410B along which the suction openings are arranged is different from the diameter 1410 of the gripper head 14 shown in FIG. 9 and FIG. 10. Grippers as shown in FIG. 11 and FIG. 12 may be used, for example, when lenses having a smaller diameter are to be sucked against the bearing surface, or if a gripper head with a different diameter of the circle turns out to be more efficient for a specific type of lens. It is then easily possible to unscrew the gripper head 14 from gripper shaft 13 (the rest of the gripper including gripper shaft 13 remains mounted) and thereafter screw a different gripper head onto gripper shaft 13.

Turning back to FIG. 4 (or FIG. 5) an important advantage of the gripper described above is that many components of the gripper 1 can be unmounted, for example if they need to be replaced or if the detection tube 16 is getting clogged, while the manifold 11 and the mounting portion 10 (comprising mounting pieces 100 and 101 as well as mounting screw 102) of gripper 1 may remain attached to the mounting support (not shown) to which gripper 1 and possibly additional grippers are mounted. Also the valves 1100, 1110 and 1120 connected to the inlets of manifold 11 as well as the supply lines for the supply of suction, overpressure and detection vacuum may remain attached thus need not be unmounted.

Unmounting can be performed as follows. First, union nut 15 is unscrewed from connecting portion 113 at the distal end of manifold 11. Union nut 15 is then axially moved along the gripper shaft 13 towards the distal end of gripper 1 and beyond gripper head 14. Connection insert 12, together with gripper shaft 13 and gripper head 14 mounted thereto, and further together with suction tube 17 and detection vacuum tube 16 can then be axially removed from manifold 11. After these components have been removed from manifold 11 it is possible to further disassemble the removed components by axially removing gripper body 13 (with gripper head 14 mounted thereto) from connection insert 12. Suction tube 17 which is screwed to connection insert 12 (see FIG. 6) remains attached with connection insert 12. Detection vacuum tube 16 is removed together with gripper body 13 and gripper head 14 since the distal end of detection vacuum tube 16 has a tight fit in detection through-opening 142. Detection vacuum tube 16 can then be axially removed from the proximal end of gripper body 13, and gripper head 14 can be unscrewed from gripper body 13. Of course, it is also possible to unscrew gripper head 14 from gripper body 13 and remove it together with detection vacuum tube 16. Removal of gripper head 14 from gripper body 13 can even be performed as the very first step, and only thereafter union nut 15 may be unscrewed. The individual components of gripper 1 can then be cleaned or replaced, if necessary. Assembly and re-mounting of the components can then be done in the reverse order, so that once the components have been pre-assembled the final step may be that union nut 15 is axially moved in the proximal direction over gripper head 14 and along gripper body 13 until it is finally screwed onto the connecting portion 113 at the distal end of manifold. Removal, disassembly, assembly and re-mounting of important gripper components is thus easily possible while the mounting portion and the manifold (including the valves and the supply lines) may remain attached to the mounting support. This allows for an easy and quick maintenance and/or replacement of individual gripper components while the manifold, valves and supply lines may remain attached to the mounting support.

Having described embodiments of the invention with the aid of the drawings it is evident that many changes or modifications can be made without departing from the teaching underlying the instant invention. Such changes or modifications are regarded as being within the scope of the invention which is defined by the appended claims.

The invention claimed is:

1. Gripper (1) for an ophthalmic lens, in particular a contact lens such as a soft contact lens, the gripper comprising:
   a gripper head (14) having a bearing surface (140), the bearing surface (140) having at least one through-opening (141) to which suction or overpressure can be applied, the bearing surface (140) further having a separate detection through-opening (142) other than the at least one through-opening (141), through which detection through-opening (142) a separate detection vacuum can be applied independent from the suction or overpressure that can be applied to the at least one through-opening (141);
   a suction channel (170) arranged in an interior of the gripper, the suction channel (170) leading to the at least one through-opening (141) in the bearing surface (140) for applying suction from the interior of the gripper to the at least one through-opening (141) in order to suck the lens against the bearing surface (140);
   an overpressure channel (130) arranged in the interior of the gripper, the overpressure channel (130) leading to the at least one through-opening (141), for applying overpressure from the interior of the gripper to the at least one through-opening (141) in the bearing surface (140) in order to release the lens from the bearing surface (140); and
   a detection vacuum tube (16) arranged in the interior of the gripper, the detection vacuum tube (16) leading to the separate detection through-opening (142) in the bearing surface (140), the detection vacuum tube (16) having a distal end which is arranged in the detection through-opening (142) in a fluid-tight manner in order to allow the detection vacuum to be applied through the detection vacuum tube (16) to the detection through-opening (142) independent from the application of the suction or overpressure applied to the at least one through-opening (141) in the bearing surface (140),
   wherein the detection through-opening (142) is arranged in the center of the bearing surface (140) of the gripper.

2. Gripper according to claim 1, wherein the gripper has a central longitudinal gripper axis (18), and wherein both the detection vacuum tube (16) in the interior of the gripper and the detection through-opening (142) in the bearing surface (140) are arranged coaxial with the central longitudinal gripper axis (18).

3. Gripper according to claim 2, wherein the gripper further comprises, viewed from a proximal end of the gripper towards a distal end of the gripper
   a mounting portion (10; 100, 101) for mounting the gripper to a mounting support;
   a manifold (11) attached to the mounting portion and comprising
      a first inlet (111) for the supply of the suction, and a first supply channel (1111) extending between the first inlet (111) and a distal end of the first supply channel for supplying the suction in a fluid-tight manner to the distal end of the first supply channel (1111),
      a second inlet (110) for the supply of overpressure, and a second supply channel (1101) extending between the second inlet (110) and a distal end of the second supply channel for supplying the overpressure in a fluid-tight manner to the distal end of the second supply channel (1101),
      a third inlet (112) for the supply of the detection vacuum, and a third supply channel (1121) extending between the third inlet (112) and a distal end of the third supply channel for supplying the detection vacuum to the distal end of the third supply channel (1121), and
      a connecting portion (113) at a distal end of the manifold (11), the connecting portion (113) having a connecting portion outer thread (1130),
   a connection insert (12) comprising
      a first connection channel connecting in a fluid-tight manner the distal end of the first supply channel (1111) to a proximal end of the suction channel arranged in the interior of the gripper,
      a second connection channel connecting in a fluid-tight manner the distal end of the second supply channel (1101) to a proximal end of the overpressure channel arranged in the interior of the gripper, and
      a third connection channel connecting in a fluid tight manner the distal end of the third supply channel (1121) to a proximal end of the detection vacuum tube (16) arranged in the interior of the gripper;
   a suction tube (17) coaxially arranged with the central longitudinal gripper axis (18) and surrounding the detection vacuum tube (16) thus forming the suction channel (170) between the detection vacuum tube (16) and the suction tube (17), the distal end of the suction tube (17) being arranged axially spaced apart from an inner end of the detection through-opening (141) in the bearing surface (140) by a predetermined distance (173);

a hollow gripper shaft (13) coaxially arranged with the central longitudinal gripper axis (18) and surrounding the suction tube (17), thus forming the overpressure channel (130) between the suction tube (17) and the hollow gripper shaft (13), the hollow gripper shaft (13) at a proximal end thereof having an abutment flange (131) protruding radially outwardly from the hollow gripper shaft (13), and at a distal end thereof having a mounting portion (132) with a mounting portion outer thread (133);

a hollow gripper head (14) at a distal end thereof having the bearing surface (140) with the at least one through-opening (141) and the detection through-opening (142), and at a proximal end thereof having an open end, with a gripper head inner thread (143) being provided on an inner wall at the proximal end of the hollow gripper head (14), the gripper head inner thread (142) being screwed onto the mounting portion outer thread (133) at the distal end of the gripper shaft (13) thus mounting the gripper head (14) to the gripper shaft (13);

a union nut (15) comprising a distal nut portion (150) having an inner diameter larger than the outer diameter of the gripper head (14) and larger than the outer diameter of the hollow gripper shaft (13) but smaller than an outer diameter of the abutment flange (131) that protrudes radially outwardly from the hollow gripper shaft (13), the union nut (15) further having a proximal nut portion (151) having an inner diameter larger than the outer diameter of the abutment flange (131) that protrudes radially outwardly from the hollow gripper shaft (13), the proximal nut portion (151) having a union nut inner thread (153), the union nut inner thread (153) being screwed onto the connection portion outer thread (1130) of the connection portion (113) of the manifold (11), thus connecting the hollow gripper shaft (13) with the gripper head (14) mounted thereto to the manifold (11).

4. Gripper according to claim 3, wherein to each of the first inlet (111), the second inlet (110) and the third inlet (112) of the manifold 11 a separate valve (1110; 1100; 1120) is connected.

5. Gripper according to claim 1, wherein the bearing surface (140) is a smooth surface which does not comprise any channels or grooves.

6. Gripper according to claim 1, wherein the at least one through-opening (141) in the bearing surface (140) comprises a plurality of openings which are arranged in the bearing surface along a circle (1410; 1410A; 1410B).

7. Gripper according to claim 6, wherein the circle (1410; 1410A, 1410B) has a diameter in the range of 5 mm to 10 mm, and in particular has a diameter of 5 mm, 6 mm, 7 mm, 8 mm, 9 mm, or 10 mm.

8. Process for transporting an ophthalmic lens, in particular a contact lens such as a soft contact lens from a start location to a destination location, the process comprising the steps of:

providing a gripper (1) according to any one of the preceding claims;

positioning the gripper head (14) with its bearing surface (140) adjacent to the lens to be transported from the start location to the destination location;

applying suction through the suction channel (170) arranged in the interior of the gripper to the at least one through-opening (141) in the bearing surface to suck the lens and make it adhere to the bearing surface (140);

moving the gripper (1) with the lens adhered to the bearing surface (140) to the destination location;

applying overpressure through the overpressure channel (130) arranged in the interior of the gripper to the at least one through-opening (141) in the bearing surface (140) to release the lens from the bearing surface (140) at the destination location; and applying a separate detection vacuum, independent from the suction or overpressure that can be applied to the at least one through-opening, to the detection through-opening (142) in the bearing surface (140) through the detection vacuum tube (16) the distal of which is arranged in a fluid-tight manner in the detection through-opening (142) so as to detect whether or not the lens is adhered to the bearing surface (140).

9. Process according to claim 8, wherein the step of applying suction through the at least one through-opening (141) in the bearing surface (140) to suck the lens to make it adhere to the bearing surface comprises applying suction through the suction channel (170) to the at least one through-opening (141) and at the same time allowing a leakage flow to flow towards the at least one through-opening (141) in the bearing surface (140), the leakage flow being chosen such that it essentially does not affect the suction applied.

10. Process according to claim 8, wherein the step of applying a separate detection vacuum to the detection through-opening (142) in the bearing surface (140) is performed after a predetermined time interval of application of suction through the at least one through-opening (141) in the bearing surface (140).

11. Process according to claim 8, wherein the step of applying a separate detection vacuum to the detection through-opening (142) in the bearing surface (140) is performed after a predetermined time interval of application of overpressure through the at least one through-opening (141) in the bearing surface (140).

* * * * *